(12) United States Patent
Hasse et al.

(10) Patent No.: US 7,384,997 B2
(45) Date of Patent: Jun. 10, 2008

(54) RUBBER MIXTURES

(75) Inventors: Andre Hasse, Linnich (DE); Philipp Albert, Lörrach (DE); Oliver Klockmann, Niederzier (DE); Karsten Korth, Grenzach-Wyhlen (DE); Reimund Pieter, Bensheim (DE)

(73) Assignee: Evonik Degussa GmbH, Essen (DE)

( * ) Notice: Subject to any disclaimer, the term of this patent is extended or adjusted under 35 U.S.C. 154(b) by 38 days.

(21) Appl. No.: 11/300,374

(22) Filed: Dec. 15, 2005

(65) Prior Publication Data

US 2006/0160935 A1      Jul. 20, 2006

(30) Foreign Application Priority Data

Dec. 18, 2004   (DE) .................. 10 2004 061 014

(51) Int. Cl.
    *C08K 5/24*    (2006.01)
(52) U.S. Cl. ...................... 524/262; 524/386
(58) Field of Classification Search ................ 524/262, 524/386
    See application file for complete search history.

(56) References Cited

U.S. PATENT DOCUMENTS

| 3,350,345 | A | 10/1967 | Vanderbilt |
| 3,842,111 | A | 10/1974 | Meyer-Simon |
| 3,873,489 | A | 3/1975 | Thurn |
| 3,978,103 | A | 8/1976 | Meyer-Simon et al. |
| 3,997,356 | A | 12/1976 | Thurn |
| 4,048,206 | A | 9/1977 | Voronkov |
| 4,076,550 | A | 2/1978 | Thurn |
| 5,780,538 | A | 7/1998 | Cohen |
| 5,914,364 | A | 6/1999 | Cohen |
| 6,140,393 | A | 10/2000 | Bomal |
| 6,331,605 | B1 | 12/2001 | Lunginsland et al. |
| 6,362,253 | B1 | 3/2002 | Durel |
| 6,465,544 | B1 | 10/2002 | Bomal |
| 6,518,335 | B2 | 2/2003 | Reedy |
| 6,548,594 | B2 | 4/2003 | Luginsland |

FOREIGN PATENT DOCUMENTS

| DE | 19544469 A1 | 3/1997 |
| GB | 1310379 A5 | 3/1973 |
| WO | WO 02/31040 A2 | 4/2002 |

OTHER PUBLICATIONS

Deschler, Ulrich, et al., "2-Chlorpropyltrialkyoxysilane ..." Angew Chem. 98, 1986, pp. 237-253. [Translation: Angew. Chem. Intl. Ed. Engl. 25, 1986, pp. 236-252.]

*Primary Examiner*—Robert D. Harlan
(74) *Attorney, Agent, or Firm*—Michael A. Sanzo; Law Office of Michael A. Sanzo, LLC

(57) ABSTRACT

The invention is directed to rubber mixtures comprising rubber, fillers, optionally further rubber auxiliaries and at least one organosilane of the general formula I:

$$R^1R^2R^3SiR^4\text{—}SH \qquad (I)$$

wherein:
$R^1$ is methyl or ethyl,
$R^2$ is methoxy, ethoxy or —O—(Y—O)$_m$—X where Y=a branched or unbranched, saturated or unsaturated divalent hydrocarbon group, X is a C1- to C9-alkyl group and m=1-40,
$R^3$ is methyl, ethyl or $R^2$,
and $R^4$ is a branched or unbranched, saturated or unsaturated, aliphatic, aromatic or mixed aliphatic/aromatic divalent $C_1$-$C_{12}$ hydrocarbon group.

The rubber mixtures according to the invention are prepared by mixing rubber, filler, optionally further rubber auxiliaries and at least one organosilane of the general formula I. The rubber mixtures can be used for the production of shaped articles.

20 Claims, No Drawings

RUBBER MIXTURES

CROSS REFERENCE TO RELATED APPLICATIONS

The present application claims priority to German application 10 2004 061 014.2, filed on Dec. 18, 2004, the contents of which is hereby incorporated by reference.

FIELD OF THE INVENTION

The invention relates to rubber mixtures, a process for their preparation and their use.

BACKGROUND OF THE INVENTION

It is known that hydrolysable sulfur-containing organosilicon compounds are capable of reacting with fillers containing hydroxyl groups, such as natural and synthetic silicates, carbonates, glasses and metal oxides. In this context, they are used for surface modification and promotion of adhesion. In the rubber processing industry, they are employed as adhesion promoters between the reinforcing filler and the polymer employed (Angew. Chem. 98, (1986) 237-253, DE2141159, DE2212239, DE19544469A1, U.S. Pat. No. 3,978,103, U.S. Pat. No. 4,048,206, EP784072A1). The best-known representatives of this substance class include the polysulfane(alkyltrialkoxysilanes), such as, for example, bis[3-triethoxysilylpropyl]tetrasulfane or bis[3-triethoxysilylpropyl]disulfane.

The use of mercapto-functionalized organosilanes in rubber mixture is also known (U.S. Pat. No. 3,350,345, FR2.094.859). The use of alkylsilanes for lowering the viscosity of rubber mixtures (EP795577A1, EP864605A2) and the combination of mercapto-functional silanes with longer-chain alkylsilanes (DE10015309A1) are likewise known.

A disadvantage of the use of the trialkoxy-functional silanes is the emission of volatile hydrocarbons, these chiefly being methanol and ethanol in practice. Dialkylmonoalkoxysilyl polysulfides are known from DE1043357A1 and EP1244676B1. Due to the dialkylmonoalkoxy group, the emission of volatile hydrocarbons is lower than in the case of trialkoxy compounds. Disadvantages of the dialkylmonoalkoxysilyl polysulfides are the poor abrasion and tear propagation resistance.

The object of the present invention is to provide rubber mixtures during the preparation of which a low emission of volatile hydrocarbons occurs, and the rubber mixtures have an improved tear propagation resistance compared with rubber mixtures with known silanes.

DESCRIPTION OF THE INVENTION

The present invention provides rubber mixtures comprising rubber, fillers, optionally further rubber auxiliaries and at least one organosilane of the general formula I $R^1R^2R^3SiR^4$—SH (I), wherein:

$R^1$ is methyl or ethyl, $R^2$ is methoxy, ethoxy or —O—(Y—O)$_m$—X, where Y=a branched or unbranched, saturated or unsaturated divalent hydrocarbon group, preferably $CH_2$, $CH_2CH_2$, $CH_2CH(CH_3)$ or $CH(CH_3)CH_2$, X is a C1- to C9-alkyl group, preferably methyl or ethyl, and m=1-40, preferably 2-30, particularly preferably 3 to 25, very particularly preferably 4 to 20, exceptionally preferably 10 to 20, $R^3$ is methyl, ethyl or $R^2$, and $R^4$ is a branched or unbranched, saturated or unsaturated, aliphatic, aromatic or mixed aliphatic/aromatic divalent $C_1$-$C_{12}$ hydrocarbon group.

Preferably, at least one of the groups $R^2$ or $R^3$ can be a —O—(Y—O)$_m$—X group.

The rubber mixtures can preferably comprise an organosilane of the general formula I: $R^1R^2R^3SiR^4$—SH (I) wherein:

$R^1$ is methyl or ethyl, $R^2$ is —O—(Y—O)$_m$—X, where Y=a branched or unbranched, saturated or unsaturated divalent hydrocarbon group, preferably $CH_2$, $CH_2CH_2$, $CH_2CH(CH_3)$ or $CH(CH_3)CH_2$, X is a C1- to C9-alkyl group, preferably methyl or ethyl, and m=1-40, preferably 2-30, particularly preferably 3 to 25, very particularly preferably 4 to 20, exceptionally preferably 10 to 20, $R^3$ is methyl, ethyl, methoxy, ethoxy or $R^2$, and $R^4$ is a branched or unbranched, saturated or unsaturated, aliphatic, aromatic or mixed aliphatic/aromatic divalent $C_1$-$C_{12}$ hydrocarbon group.

$R^4$ can preferably be $CH_2$, $CH_2CH_2$, $CH_2CH_2CH_2$, $CH_2CH_2CH_2CH_2$, $CH(CH_3)$, $CH_2CH(CH_3)$, $CH(CH_3)CH_2$, $C(CH_3)_2$, $CH(C_2H_5)$, $CH_2CH_2CH(CH_3)$ or $CH_2CH(CH_3)CH_2$.

Dimethylethoxysilylpropylmercaptan, methyldiethoxysilylpropylmercaptan, diethylethoxysilylpropylmercaptan, ethyldiethoxysilylpropylmercaptan, dimethylmethoxysilylpropylmercaptan, methyldimethoxysilylpropylmercaptan, diethylmethoxysilylpropylmercaptan, ethyldimethoxysilylpropylmercaptan, $(CH_3O)(CH_3)_2Si$—$(CH_2)_2CH(CH_3)$—SH or $(C_2H_5O)(CH_3)_2Si$—$(CH_2)_2CH(CH_3)$—SH can preferably be employed as the organosilane of the general formula I. Compounds of the formula I can also be:

[($C_4H_9O$—($CH_2$—$CH_2O$)$_2$](Me)$_2$Si($CH_2$)$_3$SH,

[($C_4H_9O$—($CH_2$—$CH_2O$)$_3$](Me)$_2$Si($CH_2$)$_3$SH,

[($C_4H_9O$—($CH_2$—$CH_2O$)$_4$](Me)$_2$Si($CH_2$)$_3$SH,

[($C_4H_9O$—($CH_2$—$CH_2O$)$_5$](Me)$_2$Si($CH_2$)$_3$SH,

[($C_4H_9O$—($CH_2$—$CH_2O$)$_6$](Me)$_2$Si($CH_2$)$_3$SH,

[($C_5H_{11}O$—($CH_2$—$CH_2O$)$_2$](Me)$_2$Si($CH_2$)$_3$SH,

[($C_5H_{11}O$—($CH_2$—$CH_2O$)$_3$](Me)$_2$Si($CH_2$)$_3$SH,

[($C_5H_{11}O$—($CH_2$—$CH_2O$)$_4$](Me)$_2$Si($CH_2$)$_3$SH,

[($C_5H_{11}O$—($CH_2$—$CH_2O$)$_5$](Me)$_2$Si($CH_2$)$_3$SH,

[($C_5H_{11}O$—($CH_2$—$CH_2O$)$_6$](Me)$_2$Si($CH_2$)$_3$SH,

[($C_6H_{13}O$—($CH_2$—$CH_2O$)$_2$](Me)$_2$Si($CH_2$)$_3$SH,

[($C_6H_{13}O$—($CH_2$—$CH_2O$)$_3$](Me)$_2$Si($CH_2$)$_3$SH,

[($C_6H_{13}O$—($CH_2$—$CH_2O$)$_4$](Me)$_2$Si($CH_2$)$_3$SH,

[($C_6H_{13}O$—($CH_2$—$CH_2O$)$_5$](Me)$_2$Si($CH_2$)$_3$SH,

[($C_6H_{13}O$—($CH_2$—$CH_2O$)$_6$](Me)$_2$Si($CH_2$)$_3$SH,

[($C_7H_{15}O$—($CH_2$—$CH_2O$)$_2$](Me)$_2$Si($CH_2$)$_3$SH,

[($C_7H_{15}O$—($CH_2$—$CH_2O$)$_3$](Me)$_2$Si($CH_2$)$_3$SH,

[($C_7H_{15}O$—($CH_2$—$CH_2O$)$_4$](Me)$_2$Si($CH_2$)$_3$SH,

[($C_7H_{15}O$—($CH_2$—$CH_2O$)$_5$](Me)$_2$Si($CH_2$)$_3$SH,

[($C_7H_{15}O$—($CH_2$—$CH_2O$)$_6$](Me)$_2$Si($CH_2$)$_3$SH,

[(C₈H₁₇O—(CH₂—CH₂O)₂](Me)₂Si(CH₂)₃SH,
[(C₈H₁₇O—(CH₂—CH₂O)₃](Me)₂Si(CH₂)₃SH,
[(C₈H₁₇O—(CH₂—CH₂O)₄](Me)₂Si(CH₂)₃SH,
[(C₈H₁₇O—(CH₂—CH₂O)₅](Me)₂Si(CH₂)₃SH,
[(C₈H₁₇O—(CH₂—CH₂O)₆](Me)₂Si(CH₂)₃SH,
[(C₉H₁₉O—(CH₂—CH₂O)₂](Me)₂Si(CH₂)₃SH,
[(C₉H₁₉O—(CH₂—CH₂O)₃](Me)₂Si(CH₂)₃SH,
[(C₉H₁₉O—(CH₂—CH₂O)₄](Me)₂Si(CH₂)₃SH,
[(C₉H₁₉O—(CH₂—CH₂O)₅](Me)₂Si(CH₂)₃SH,
[(C₉H₁₉O—(CH₂—CH₂O)₆](Me)₂Si(CH₂)₃SH,
[(C₄H₉O—(CH₂—CH₂O)₂]₂(Me)Si(CH₂)₃SH,
[(C₄H₉O—(CH₂—CH₂O)₃]₂(Me)Si(CH₂)₃SH,
[(C₄H₉O—(CH₂—CH₂O)₄]₂(Me)Si(CH₂)₃SH,
[(C₄H₉O—(CH₂—CH₂O)₅]₂(Me)Si(CH₂)₃SH,
[(C₄H₉O—(CH₂—CH₂O)₆]₂(Me)Si(CH₂)₃SH,
[(C₅H₁₁O—(CH₂—CH₂O)₂]₂(Me)Si(CH₂)₃SH,
[(C₅H₁₁O—(CH₂—CH₂O)₃]₂(Me)Si(CH₂)₃SH,
[(C₅H₁₁O—(CH₂—CH₂O)₄]₂(Me)Si(CH₂)₃SH,
[(C₅H₁₁O—(CH₂—CH₂O)₅]₂(Me)Si(CH₂)₃SH,
[(C₅H₁₁O—(CH₂—CH₂O)₆]₂(Me)Si(CH₂)₃SH,
[(C₆H₁₃O—(CH₂—CH₂O)₂]₂(Me)Si(CH₂)₃SH,
[(C₆H₁₃O—(CH₂—CH₂O)₃]₂(Me)Si(CH₂)₃SH,
[(C₆H₁₃O—(CH₂—CH₂O)₄]₂(Me)Si(CH₂)₃SH,
[(C₆H₁₃O—(CH₂—CH₂O)₅]₂(Me)Si(CH₂)₃SH,
[(C₆H₁₃O—(CH₂—CH₂O)₆]₂(Me)Si(CH₂)₃SH,
[(C₇H₁₅O—(CH₂—CH₂O)₂]₂(Me)Si(CH₂)₃SH,
[(C₇H₁₅O—(CH₂—CH₂O)₃]₂(Me)Si(CH₂)₃SH,
[(C₇H₁₅O—(CH₂—CH₂O)₄]₂(Me)Si(CH₂)₃SH,
[(C₇H₁₅O—(CH₂—CH₂O)₅]₂(Me)Si(CH₂)₃SH,
[(C₇H₁₅O—(CH₂—CH₂O)₆]₂(Me)Si(CH₂)₃SH,
[(C₈H₁₇O—(CH₂—CH₂O)₂]₂(Me)Si(CH₂)₃SH,
[(C₈H₁₇O—(CH₂—CH₂O)₃]₂(Me)Si(CH₂)₃SH,
[(C₈H₁₇O—(CH₂—CH₂O)₄]₂(Me)Si(CH₂)₃SH,
[(C₈H₁₇O—(CH₂—CH₂O)₅]₂(Me)Si(CH₂)₃SH,
[(C₈H₁₇O—(CH₂—CH₂O)₆]₂(Me)Si(CH₂)₃SH,
[(C₉H₁₉O—(CH₂—CH₂O)₂]₂(Me)Si(CH₂)₃SH,
[(C₉H₁₉O—(CH₂—CH₂O)₃]₂(Me)Si(CH₂)₃SH,
[(C₉H₁₉O—(CH₂—CH₂O)₄]₂(Me)Si(CH₂)₃SH,
[(C₉H₁₉O—(CH₂—CH₂O)₅]₂(Me)Si(CH₂)₃SH,
[(C₉H₁₉O—(CH₂—CH₂O)₆]₂(Me)Si(CH₂)₃SH,
[(C₄H₉O—(CH₂—CH₂O)₂](Me)(EtO)Si(CH₂)₃SH,
[(C₄H₉O—(CH₂—CH₂O)₃](Me)(EtO)Si(CH₂)₃SH,
[(C₄H₉O—(CH₂—CH₂O)₄](Me)(EtO)Si(CH₂)₃SH,
[(C₄H₉O—(CH₂—CH₂O)₅](Me)(EtO)Si(CH₂)₃SH,
[(C₄H₉O—(CH₂—CH₂O)₆](Me)(EtO)Si(CH₂)₃SH,
[(C₅H₁₁O—(CH₂—CH₂O)₂](Me)(EtO)Si(CH₂)₃SH,
[(C₅H₁₁O—(CH₂—CH₂O)₃](Me)(EtO)Si(CH₂)₃SH,
[(C₅H₁₁O—(CH₂—CH₂O)₄](Me)(EtO)Si(CH₂)₃SH,
[(C₅H₁₁O—(CH₂—CH₂O)₅](Me)(EtO)Si(CH₂)₃SH,
[(C₅H₁₁O—(CH₂—CH₂O)₆](Me)(EtO)Si(CH₂)₃SH,
[(C₆H₁₃O—(CH₂—CH₂O)₂](Me)(EtO)Si(CH₂)₃ SH,
[(C₆H₁₃O—(CH₂—CH₂O)₃](Me)(EtO)Si(CH₂)₃SH,
[(C₆H₁₃O—(CH₂—CH₂O)₄](Me)(EtO)Si(CH₂)₃SH,
[(C₆H₁₃O—(CH₂—CH₂O)₅](Me)(EtO)Si(CH₂)₃SH,
[(C₆H₁₃O—(CH₂—CH₂O)₆](Me)(EtO)Si(CH₂)₃SH,
[(C₇H₁₅O—(CH₂—CH₂O)₂](Me)(EtO)Si(CH₂)₃SH,
[(C₇H₁₅O—(CH₂—CH₂O)₃](Me)(EtO)Si(CH₂)₃SH,
[(C₇H₁₅O—(CH₂—CH₂O)₄](Me)(EtO)Si(CH₂)₃SH,
[(C₇H₁₅O—(CH₂—CH₂O)₅](Me)(EtO)Si(CH₂)₃SH,
[(C₇H₁₅O—(CH₂—CH₂O)₆](Me)(EtO)Si(CH₂)₃SH,
[(C₈H₁₇O—(CH₂—CH₂O)₂](Me)(EtO)Si(CH₂)₃SH,
[(C₈H₁₇O—(CH₂—CH₂O)₃](Me)(EtO)Si(CH₂)₃SH,
[(C₈H₁₇O—(CH₂—CH₂O)₄](Me)(EtO)Si(CH₂)₃SH,
[(C₈H₁₇O—(CH₂—CH₂O)₅](Me)(EtO)Si(CH₂)₃SH,
[(C₈H₁₇O—(CH₂—CH₂O)₆](Me)(EtO)Si(CH₂)₃SH,
[(C₉H₁₉O—(CH₂—CH₂O)₂](Me)(EtO)Si(CH₂)₃SH,
[(C₉H₁₉O—(CH₂—CH₂O)₃](Me)(EtO)Si(CH₂)₃SH,
[(C₉H₁₉O—(CH₂—CH₂O)₄](Me)(EtO)Si(CH₂)₃SH,
[(C₉H₁₉O—(CH₂—CH₂O)₅](Me)(EtO)Si(CH₂)₃SH,
[(C₉H₁₉O—(CH₂—CH₂O)₆](Me)(EtO)Si(CH₂)₃SH,
[(C₄H₉O—(CH₂—CH₂O)₂](Me)(MeO)Si(CH₂)₃SH,
[(C₄H₉O—(CH₂—CH₂O)₃](Me)(MeO)Si(CH₂)₃SH,
[(C₄H₉O—(CH₂—CH₂O)₄](Me)(MeO)Si(CH₂)₃SH,
[(C₄H₉O—(CH₂—CH₂O)₅](Me)(MeO)Si(CH₂)₃ SH,
[(C₄H₉O—(CH₂—CH₂O)₆](Me)(MeO)Si(CH₂)₃SH,
[(C₅H₁₁O—(CH₂—CH₂O)₂](Me)(MeO)Si(CH₂)₃SH,
[(C₅H₁₁O—(CH₂—CH₂O)₃](Me)(MeO)Si(CH₂)₃SH,
[(C₅H₁₁O—(CH₂—CH₂O)₄](Me)(MeO)Si(CH₂)₃SH,
[(C₅H₁₁O—(CH₂—CH₂O)₅](Me)(MeO)Si(CH₂)₃SH,
[(C₅H₁₁O—(CH₂—CH₂O)₆](Me)(MeO)Si(CH₂)₃SH,
[(C₆H₁₃O—(CH₂—CH₂O)₂](Me)(MeO)Si(CH₂)₃SH,
[(C₆H₁₃O—(CH₂—CH₂O)₃](Me)(MeO)Si(CH₂)₃SH,
[(C₆H₁₃O—(CH₂—CH₂O)₄](Me)(MeO)Si(CH₂)₃SH,
[(C₆H₁₃O—(CH₂—CH₂O)₅](Me)(MeO)Si(CH₂)₃SH,
[(C₆H₁₃O—(CH₂—CH₂O)₆](Me)(MeO)Si(CH₂)₃SH,
[(C₇H₁₅O—(CH₂—CH₂O)₂](Me)(MeO)Si(CH₂)₃SH,
[(C₇H₁₅O—(CH₂—CH₂O)₃](Me)(MeO)Si(CH₂)₃SH,
[(C₇H₁₅O—(CH₂—CH₂O)₄](Me)(MeO)Si(CH₂)₃SH,
[(C₇H₁₅O—(CH₂—CH₂O)₅](Me)(MeO)Si(CH₂)₃SH,
[(C₇H₁₅O—(CH₂—CH₂O)₆](Me)(MeO)Si(CH₂)₃SH,

[(C$_8$H$_{17}$O—(CH$_2$—CH$_2$O)$_2$](Me)(MeO)Si(CH$_2$)$_3$SH,

[(C$_8$H$_{17}$O—(CH$_2$—CH$_2$O)$_3$](Me)(MeO)Si(CH$_2$)$_3$SH,

[(C$_8$H$_{17}$O—(CH$_2$—CH$_2$O)$_4$](Me)(MeO)Si(CH$_2$)$_3$SH,

[(C$_8$H$_{17}$O—(CH$_2$—CH$_2$O)$_5$](Me)(MeO)Si(CH$_2$)$_3$SH,

[(C$_8$H$_{17}$O—(CH$_2$—CH$_2$O)$_6$](Me)(MeO)Si(CH$_2$)$_3$SH,

[(C$_9$H$_{19}$O—(CH$_2$—CH$_2$O)$_2$](Me)(MeO)Si(CH$_2$)$_3$SH,

[(C$_9$H$_{19}$O—(CH$_2$—CH$_2$O)$_3$](Me)(MeO)Si(CH$_2$)$_3$SH,

[(C$_9$H$_{19}$O—(CH$_2$—CH$_2$O)$_4$](Me)(MeO)Si(CH$_2$)$_3$SH,

[(C$_9$H$_{19}$O—(CH$_2$—CH$_2$O)$_5$](Me)(MeO)Si(CH$_2$)$_3$SH or

[(C$_9$H$_{19}$O—(CH$_2$—CH$_2$O)$_6$](Me)(MeO)Si(CH$_2$)$_3$SH,
where Me=CH$_3$ and Et=CH$_2$CH$_3$.

Compounds of the formula I where X=C$_3$H$_7$, C$_4$H$_9$, C$_5$H$_1$, C$_6$H$_{13}$, C$_7$H$_{15}$, C$_8$H$_{17}$ or C$_9$H$_{19}$ can be:

[(X—O—(CH$_2$—CH(CH$_3$)O—)$_2$](Me)(MeO)Si(CH$_2$)$_3$SH,

[(X—O—(CH$_2$—CH(CH$_3$)O—)$_3$](Me)(MeO)Si(CH$_2$)$_3$SH,

[(X—O—(CH$_2$—CH(CH$_3$)O—)$_4$](Me)(MeO)Si(CH$_2$)$_3$SH,

[(X—O—(CH$_2$—CH(CH$_3$)O—)$_5$](Me)(MeO)Si(CH$_2$)$_3$SH,

[(X—O—(CH$_2$—CH(CH$_3$)O—)$_6$](Me)(MeO)Si(CH$_2$)$_3$SH,

[(X—O—(CH$_2$—CH(CH$_3$)O—)$_7$](Me)(MeO)Si(CH$_2$)$_3$SH,

[(X—O—(CH$_2$—CH(CH$_3$)O—)$_8$](Me)(MeO)Si(CH$_2$)$_3$SH,

[(X—O—(CH$_2$—CH(CH$_3$)O—)$_9$](Me)(MeO)Si(CH$_2$)$_3$SH,

[(X—O—(CH$_2$—CH(CH$_3$)O—)$_{10}$](Me)(MeO)Si(CH$_2$)$_3$SH,

[(X—O—(CH$_2$—CH(CH$_3$)O—)$_{11}$](Me)(MeO)Si(CH$_2$)$_3$SH,

[(X—O—(CH$_2$—CH(CH$_3$)O—)$_{12}$](Me)(MeO)Si(CH$_2$)$_3$SH,

[(X—O—(CH$_2$—CH(CH$_3$)O—)$_{13}$](Me)(MeO)Si(CH$_2$)$_3$SH,

[(X—O—(CH$_2$—CH(CH$_3$)O—)$_{14}$](Me)(MeO)Si(CH$_2$)$_3$SH,

[(X—O—(CH$_2$—CH(CH$_3$)O—)$_{15}$](Me)(MeO)Si(CH$_2$)$_3$SH,

[(X—O—(CH$_2$—CH(CH$_3$)O—)$_{16}$](Me)(MeO)Si(CH$_2$)$_3$SH,

[(X—O—(CH$_2$—CH(CH$_3$)O—)$_{17}$](Me)(MeO)Si(CH$_2$)$_3$SH,

[(X—O—(CH$_2$—CH(CH$_3$)O—)$_{18}$](Me)(MeO)Si(CH$_2$)$_3$SH,

[(X—O—(CH$_2$—CH(CH$_3$)O—)$_{19}$](Me)(MeO)Si(CH$_2$)$_3$SH,

[(X—O—(CH$_2$—CH(CH$_3$)O—)$_{20}$](Me)(MeO)Si(CH$_2$)$_3$SH,

[(X—O—(CH$_2$—CH(CH$_3$)O—)$_2$](Me)(EtO)Si(CH$_2$)$_3$SH,

[(X—O—(CH$_2$—CH(CH$_3$)O—)$_3$](Me)(EtO)Si(CH$_2$)$_3$SH,

[(X—O—(CH$_2$—CH(CH$_3$)O—)$_4$](Me)(EtO)Si(CH$_2$)$_3$SH,

[(X—O—(CH$_2$—CH(CH$_3$)O—)$_5$](Me)(EtO)Si(CH$_2$)$_3$SH,

[(X—O—(CH$_2$—CH(CH$_3$)O—)$_6$](Me)(EtO)Si(CH$_2$)$_3$SH,

[(X—O—(CH$_2$—CH(CH$_3$)O—)$_7$](Me)(EtO)Si(CH$_2$)$_3$SH,

[(X—O—(CH$_2$—CH(CH$_3$)O—)$_8$](Me)(EtO)Si(CH$_2$)$_3$SH,

[(X—O—(CH$_2$—CH(CH$_3$)O—)$_9$](Me)(EtO)Si(CH$_2$)$_3$SH,

[(X—O—(CH$_2$—CH(CH$_3$)O—)$_{10}$](Me)(EtO)Si(CH$_2$)$_3$SH,

[(X—O—(CH$_2$—CH(CH$_3$)O—)$_{11}$](Me)(EtO)Si(CH$_2$)$_3$SH,

[(X—O—(CH$_2$—CH(CH$_3$)O—)$_{12}$](Me)(EtO)Si(CH$_2$)$_3$SH,

[(X—O—(CH$_2$—CH(CH$_3$)O—)$_{13}$](Me)(EtO)Si(CH$_2$)$_3$SH,

[(X—O—(CH$_2$—CH(CH$_3$)O—)$_{14}$](Me)(EtO)Si(CH$_2$)$_3$SH,

[(X—O—(CH$_2$—CH(CH$_3$)O—)$_{15}$](Me) (EtO)Si(CH$_2$)$_3$SH,

[(X—O—(CH$_2$—CH(CH$_3$)O—)$_{16}$](Me)(EtO)Si(CH$_2$)$_3$SH,

[(X—O—(CH$_2$—CH(CH$_3$)O—)$_{17}$](Me)(EtO)Si(CH$_2$)$_3$SH,

[(X—O—(CH$_2$—CH(CH$_3$)O—)$_{18}$](Me)(EtO)Si(CH$_2$)$_3$SH,

[(X—O—(CH$_2$—CH(CH$_3$)O—)$_{19}$](Me)(EtO)Si(CH$_2$)$_3$SH,

[(X—O—(CH$_2$—CH(CH$_3$)O—)$_{20}$](Me)(EtO)Si(CH$_2$)$_3$SH,

[(X—O—(CH$_2$—CH(CH$_3$)O—)$_{19}$](Me)(EtO)Si(CH$_2$)$_3$SH,

[(X—O—(CH$_2$—CH(CH$_3$)O—)$_{20}$](Me)(EtO)Si(CH$_2$)$_3$SH,

[(X—O—(CH$_2$—CH(CH$_3$)O—)$_2$]$_2$(Me)Si(CH$_2$)$_3$SH,

[(X—O—(CH$_2$—CH(CH$_3$)O—)$_3$]$_2$(Me)Si(CH$_2$)$_3$SH,

[(X—O—(CH$_2$—CH(CH$_3$)O—)$_4$]$_2$(Me)Si(CH$_2$)$_3$SH,

[(X—O—(CH$_2$—CH(CH$_3$)O—)$_5$]$_2$(Me)Si(CH$_2$)$_3$SH,

[(X—O—(CH$_2$—CH(CH$_3$)O—)$_6$]$_2$(Me)Si(CH$_2$)$_3$SH,

[(X—O—(CH$_2$—CH(CH$_3$)O—)$_7$]$_2$(Me)Si(CH$_2$)$_3$SH,

[(X—O—(CH$_2$—CH(CH$_3$)O—)$_8$]$_2$(Me)Si(CH$_2$)$_3$SH,

[(X—O—(CH$_2$—CH(CH$_3$)O—)$_9$]$_2$(Me)Si(CH$_2$)$_3$SH,

[(X—O—(CH$_2$—CH(CH$_3$)O—)$_{10}$]$_2$(Me)Si(CH$_2$)$_3$SH,

[(X—O—(CH$_2$—CH(CH$_3$)O—)$_{11}$]$_2$(Me)Si(CH$_2$)$_3$SH,

[(X—O—(CH$_2$—CH(CH$_3$)O—)$_{12}$]$_2$(Me)Si(CH$_2$)$_3$SH,

[(X—O—(CH$_2$—CH(CH$_3$)O—)$_{13}$]$_2$(Me)Si(CH$_2$)$_3$SH,

[(X—O—(CH$_2$—CH(CH$_3$)O—)$_{14}$]$_2$(Me)Si(CH$_2$)$_3$SH,

[(X—O—(CH$_2$—CH(CH$_3$)O—)$_{15}$]$_2$(Me)Si(CH$_2$)$_3$SH,

[(X—O—(CH$_2$—CH(CH$_3$)O—)$_{16}$]$_2$(Me)Si(CH$_2$)$_3$SH,

[(X—O—(CH$_2$—CH(CH$_3$)O—)$_{17}$]$_2$(Me)Si(CH$_2$)$_3$SH,

[(X—O—(CH$_2$—CH(CH$_3$)O—)$_{18}$]$_2$(Me)Si(CH$_2$)$_3$SH,

[(X—O—(CH$_2$—CH(CH$_3$)O—)$_{19}$]$_2$(Me)Si(CH$_2$)$_3$SH,

[(X—O—(CH$_2$—CH(CH$_3$)O—)$_{20}$]$_2$(Me)Si(CH$_2$)$_3$SH,

[(X—O—(CH$_2$—CH(CH$_3$)O—)$_2$](Me)$_2$Si(CH$_2$)$_3$SH,

[(X—O—(CH$_2$—CH(CH$_3$)O—)$_3$](Me)$_2$Si(CH$_2$)$_3$SH,

[(X—O—(CH$_2$—CH(CH$_3$)O—)$_4$](Me)$_2$Si(CH$_2$)$_3$SH,

[(X—O—(CH$_2$—CH(CH$_3$)O—)$_5$](Me)$_2$Si(CH$_2$)$_3$SH,

[(X—O—(CH$_2$—CH(CH$_3$)O—)$_6$](Me)$_2$Si(CH$_2$)$_3$SH,

[(X—O—(CH$_2$—CH(CH$_3$)O—)$_7$](Me)$_2$Si(CH$_2$)$_3$SH,

[(X—O—(CH$_2$—CH(CH$_3$)O—)$_8$](Me)$_2$Si(CH$_2$)$_3$SH,

[(X—O—(CH$_2$—CH(CH$_3$)O—)$_9$](Me)$_2$Si(CH$_2$)$_3$SH,

[(X—O—(CH$_2$—CH(CH$_3$)O—)$_{10}$](Me)$_2$Si(CH$_2$)$_3$SH,

[(X—O—(CH$_2$—CH(CH$_3$)O—)$_{11}$](Me)$_2$Si(CH$_2$)$_3$SH,

[(X—O—(CH$_2$—CH(CH$_3$)O—)$_{12}$](Me)$_2$Si(CH$_2$)$_3$SH,

[(X—O—(CH$_2$—CH(CH$_3$)O—)$_{13}$](Me)$_2$Si(CH$_2$)$_3$SH,

[(X—O—(CH$_2$—CH(CH$_3$)O—)$_{14}$](Me)$_2$Si(CH$_2$)$_3$SH,

[(X—O—(CH$_2$—CH(CH$_3$)O—)$_{15}$](Me)$_2$Si(CH$_2$)$_3$SH,

[(X—O—(CH$_2$—CH(CH$_3$)O—)$_{16}$](Me)$_2$Si(CH$_2$)$_3$SH,

[(X—O—(CH$_2$—CH(CH$_3$)O—)$_{17}$](Me)$_2$Si(CH$_2$)$_3$SH,

[(X—O—(CH$_2$—CH(CH$_3$)O—)$_{18}$](Me)$_2$Si(CH$_2$)$_3$SH,

[(X—O—(CH$_2$—CH(CH$_3$)O—)$_{19}$](Me)$_2$Si(CH$_2$)$_3$SH or

[(X—O—(CH$_2$—CH(CH$_3$)O—)$_{20}$](Me)$_2$Si(CH$_2$)$_3$SH.

The organosilane of the general formula I can consist of a mixture of compounds of organosilanes of the general formula I. The mixtures can comprise compounds of organosilanes with the same or different m. The mixtures of organosilanes can comprise compounds with the same or different Y groups. The mixtures can comprise compounds of organosilanes with the same or different $R^1$, $R^2$, $R^3$ or $R^4$ groups.

Condensation products, that is to say oligo- and polysiloxanes, can be formed from the organosilanes of the general formula I. The oligo- and polysiloxanes can be obtained by oligomerization or co-oligomerization of the corresponding alkoxysilane compounds of the general formula I by addition of water and the addition of additives and procedure known to the person skilled in the art in this field. The oligo- and polymerization products formed in this way can be contained in the organosilane compounds of the general formula I. The organosilane of the general formula I can also be an oligo- or polymerization product of the organosilane compound of the general formula I. The organosilane of the general formula I can be a mixture of oligo- or polymerization products of the organosilane compound of the general formula I and non-condensed organosilane compound of the general formula I.

The organosilane of the general formula I can be added to the mixing process either in the pure form or in a form absorbed on an inert organic or inorganic support, as well as in a form prereacted with an organic or inorganic support. Preferred support materials are precipitated or pyrogenic silicas, waxes, thermoplastics, natural or synthetic silicates, natural or synthetic oxides, specifically aluminium oxide, or carbon blacks. The organosilanes of the general formula I can furthermore also be added to the mixing process in a form prereacted with the filler to be employed.

The following fillers can be employed as fillers for the rubber mixtures according to the invention:

Carbon blacks: The carbon blacks to be used here are prepared by the flame black, furnace, gas black or thermal process and have BET surface areas of from 20 to 200 m$^2$/g. The carbon blacks can optionally also contain heteroatoms, such as, for example, Si.

Amorphous silicas, prepared, for example, by precipitation of solutions of silicates or flame hydrolysis of silicon halides with specific surface areas of from 5 to 1,000 m$^2$/g, preferably 20 to 400 m$^2$/g (BET surface area) and with primary particles sizes of from 10 to 400 nm. The silicas can optionally also be present as mixed oxides with other metal oxides, such as Al, Mg, Ca, Ba, Zn and titanium oxides.

Synthetic silicates, such as aluminium silicate, alkaline earth metal silicates, such as magnesium silicate or calcium silicate, with BET surface areas of from 20 to 400 m$^2$/g and primary particle diameters of from 10 to 400 nm.

Synthetic or natural aluminium oxides and hydroxides.

Natural silicates, such as kaolin and other naturally occurring silicas.

Glass fibres and glass fibre products (mats, strands) or glass microbeads.

Preferably, amorphous silicas prepared by precipitation from silicate solutions, with BET surface areas of from 20 to 400 m$^2$/g are employed, in amounts of from 5 to 150 parts by wt., in each case based on 100 parts of rubber.

In addition to natural rubber, synthetic rubbers can also be employed for the preparation of the rubber mixtures according to the invention. Preferred synthetic rubbers are described, for example, in W. Hofmann, Kautschuktechnologie, Genter Verlag, Stuttgart 1980. They include, inter alia, polybutadiene (BR), polyisoprene (IR), styrene/butadiene copolymers, for example emulsion SBR (E-SBR) or solution SBR (S-SBR), preferably having styrene contents of from 1 to 60, particularly preferably 5 to 50 wt. % (SBR), chloroprene (CR), isobutylene/isoprene copolymers (IIR), butadiene/acrylonitrile copolymers with acrylonitrile contents of from 5 to 60, preferably 10 to 50 wt. % (NBR), partly hydrogenated or completely hydrogenated NBR rubber (HNBR), ethylene/propylene/diene copolymers (EPDM), the abovementioned rubbers which additionally have functional groups, such as e.g. carboxyl, silanol or epoxide groups, for example epoxidized NR, carboxy-functionalized NBR or silanol- (—SiOH) or siloxy-functionalized (—Si—OR) SBR, and mixtures of these rubbers. Anionically polymerized S-SBR rubbers (solution SBR) having a glass transition temperature above −50° C. and mixtures thereof with diene rubbers can be employed in particular for the production of car tire treads.

The rubber crude mixtures and vulcanization products according to the invention can comprise further rubber auxiliaries, such as reaction accelerators, antioxidants, heat stabilizers, light stabilizers, anti-ozonants, processing auxiliaries, plasticizers, tackifiers, blowing agents, dyestuffs, pigments, waxes, extenders, organic acids, retardants, metal oxides or activators, such as triethanolamine or hexanetriol. Polyalkylene glycols can be further rubber auxiliaries. Polyalkylene glycols can be polyethylene glycols, polypropylene glycols or/and polybutylene glycols.

The polyalkylene glycols can have a molecular weight of between 50 and 50,000 g/mol, preferably between 50 and 20,000 g/mol, particularly preferably between 200 and 10,000 g/mol, very particularly preferably between 400 and 6,000 g/mol, exceptionally preferably between 500 and 3,000 g/mol.

The polyethylene glycols can be hydrocarbon-terminated polyethylene glycol Alk-O—(CH$_2$—CH$_2$-O)$_{y^1}$—H or Alk-(CH$_2$—CH$_2$-O)$_{y^1}$-Alk, where $y^1$=2-25, preferably $y^1$=2-15, particularly preferably $y^1$=3-8 and 10-14, very particularly preferably $y^1$=3-6 and 10-13, and Alk is a branched or unbranched, unsubstituted or substituted, saturated or unsaturated hydrocarbon having 1 to 35, preferably 4 to 25, particularly preferably 6 to 20, very particularly preferably 10 to 20, exceptionally preferably 11 to 14 carbon atoms.

The polypropylene glycols can also be hydrocarbon-terminated polypropylene glycol Alk-O—(CH$_2$—CH(CH$_3$)—O)$_{y^1}$—H or Alk-O—(CH$_2$—CH(CH$_3$)—O)$_{y^1}$-Alk, wherein $y^1$ and Alk have the abovementioned meaning.

The polybutylene glycols can also be hydrocarbon-terminated polybutylene glycol Alk-O—(CH$_2$—CH$_2$—CH$_2$—CH$_2$—O)$_{y'}$—H, Alk-O—(CH$_2$—CH(CH$_3$)—CH$_2$—O)$_{y'}$—H, Alk-O—(CH$_2$—CH$_2$—CH$_2$—CH$_2$—O)$_{y'}$-Alk or Alk-O—(CH$_2$—CH(CH$_3$)—CH$_2$—O)$_{y'}$-Alk, wherein y$^1$ and Alk have the abovementioned meaning.

Polyalkylene glycols can be neopentylglycol HO—CH$_2$—C(Me)$_2$—CH$_2$—OH, pentaerythritol C(CH$_2$—OH)$_4$ or trimethylolpropane CH$_3$—CH$_2$—C(CH$_2$—OH)$_3$ etherified with polyethylene glycol, polypropylene glycol, polybutylene glycol or with mixtures thereof, wherein the recurring units of ethylene glycol, propylene glycol or/and butylene glycol in the etherified polyalcohols number between 2 and 100, preferably between 2 and 50, particularly preferably between 3 and 30, very particularly preferably between 3 and 15.

The rubber auxiliaries can be employed in known amounts, which depend, inter alia, on the intended use. Conventional amounts are, for example, 0.1 to 50 wt %, preferably 0.1 to 30 wt %, based on the rubber. Sulfur or sulfur-donating substances can be employed as crosslinking agents. The rubber mixtures according to the invention can furthermore comprise vulcanization accelerators. For example, mercaptobenzothiazoles, sulfenamides, guanidines, thiurams, dithiocarbamates, thioureas and thiocarbonates can be employed as suitable vulcanization accelerators. The vulcanization accelerators and sulfur can be employed in amounts of from 0.1 to 10 wt. %, preferably 0.1 to 5 wt. %, based on the rubber.

The present invention also provides a process for the preparation of the rubber mixture according to the invention, which is characterized in that the rubber, filler, optionally further rubber auxiliaries and at least one organosilane of the general formula I are mixed.

The vulcanization of the rubber mixtures according to the invention can be carried out at temperatures of from 100 to 200° C., preferably 130 to 180° C., optionally under a pressure of from 10 to 200 bar. The mixing of the rubbers with the filler, optionally rubber auxiliaries and the organosilanes of the general formula I can be carried out in known mixing units, such as roll mills, internal mixers and mixing extruders.

The rubber mixtures according to the invention can be used for the production of shaped articles, for example for the production of pneumatic tires, tire treads, cable sheathings, hoses, drive belts, conveyor belts, roller coverings, tires, shoe soles, sealing rings and damping elements. The rubber mixtures according to the invention show an improve tear propagation resistance.

EXAMPLES

Example 1

3-Mercaptopropyl(dimethylethoxysilane) (MPDMES)

37.5 g of dried NaSH and 600 ml of dry ethanol are initially introduced into an autoclave with a glass double-walled jacket and Hastelloy C22 lid+fittings (Beuchi AG) at room temperature. The suspension is heated, and stirred at 50° C. for 20 min. A mixture of 100 g 3-chloropropyl (dimethylethoxysilane) and 5 g 3-chloropropyl(dimethylchlorosilane) is added to the suspension with a pressure burette. A further 200 ml ethanol are added to the mixture, and the mixture is heated to 93-96° C., while stirring. The temperature is maintained for 180 min. The mixture is then cooled to room temperature. The suspension formed is filtered and the filter cake is washed with toluene. The filtrate is freed from the solvent on a rotary evaporator. The suspension obtained is filtered, the filter cake is washed with toluene and the filtrate is freed from toluene again on a rotary evaporator. 88.3 g of a liquid, colourless product are obtained.

Comparison Example 1

[(EtO)Me$_2$S$_1$—CH$_2$—CH$_2$—CH$_2$—]$_2$S$_{3.66}$ 700 ml ethanol are weighed into a 2,000 ml four-necked flask with 337 g of dried Na$_2$S$_4$ (1.94 mol) and 700 g 3-chloropropyl(dimethylethoxysilane) (3.88 mol) and the mixture is heated to the boiling point, while stirring. The reaction solution is boiled under reflux for 270 min. 3 g 3-chloropropyl(dimethylethoxysilane) are added to the suspension and the mixture is heated under reflux for a further 30 min. The suspension is cooled and filtered and the residue is washed with ethanol. The filtrate is freed from the solvent on a rotary evaporator under 20-400 mbar at 60-90° C. and filtered again. 769.2 g of an orange liquid are isolated.

Analysis:

$^1$H-NMR

| Content of 3-chloropropyl-(dimethyl- | Content of [(EtO)Me$_2$Si—CH$_2$—CH$_2$—CH$_2$—]$_2$S$_x$ 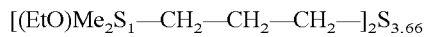 | | |
|---|---|---|---|
| ethoxy-silane) mol % | x = 2 mol % | x = 3 mol % | x = 4 mol % |
| 2.8 | 17.1 | 28.0 | 25.2 |

The average chain length —S$_x$—, based on the NMR data (S$_1$-S$_{10}$), is 3.66.

$^{29}$Si-NMR

Comparison Example 1 contains 1.6 mol % of dimerized [(EtO)Me$_2$S$_1$—CH$_2$—CH$_2$—CH$_2$—]2S$_x$.

A DRX 500 NMR apparatus from Bruker is used for analysis of the comparison product according to the rules and operating conditions known to the person skilled in the art. The measurement frequencies are 99.35 MHz for $^{29}$Si nuclei and 500.13 MHz for $^1$H nuclei. Tetramethylsilane (TMS) serves as the reference. The analysis of bis(alkoxysilylorganyl) polysulfides and mercaptoorganyl(alkoxysilanes) and mixtures thereof is described, for example, in U. Görl, J. Münzenberg, D. Luginsland, A. Müller Kautschuk Gummi Kunststoffe 1999, 52(9), 588 et seq., D. Luginsland Kautschuk Gummi Kunststoffe 2000, 53(1-2), 10 et seq. or M. W. Backer et al, Polymer Preprints 2003, 44(1), 245 et seq.

Example 2

Rubber Investigations

The recipe used for the rubber mixtures is given in the following Table 1. The unit "phr" here means content by weight, based on 100 parts of the crude rubber employed. The silanes according to the invention are metered in equal weights. The general process for the preparation of rubber mixtures and vulcanization products thereof is described in the book: "Rubber Technology Handbook", W. Hofmann, Hanser Verlag 1994. The coupling reagents Si 69, a bis-(triethoxysilylpropyl) tetrasulfide (TESPT), and VP Si 263, a 3-mercaptopropyl-(triethoxysilane) (MPTES), are commercial products from Degussa AG. The coupling reagent VP Si 208, an octylsilyltriethoxysilane, as an alkylsilane, is a processing auxiliary and is a commercial product from Degussa AG.

TABLE 1

| Substance | Mixture 1 Reference [phr] | Mixture 2 Reference [phr] | Mixture 3 Reference [phr] | Mixture 4 [phr] |
|---|---|---|---|---|
| 1st stage | | | | |
| Buna VSL 5025-1 | 96 | 96 | 96 | 96 |
| Buna CB 24 | 30 | 30 | 30 | 30 |
| Ultrasil 7000 GR | 80 | 80 | 80 | 80 |
| Si 69 (TESPT) | 2 | — | — | — |
| VP Si 263 (MPTES) | — | 2 | — | — |
| Silane from Comparison Example 1 (DMESPT) | — | — | 2 | — |
| Silane from Example 1 (MPDMES) | — | — | — | 2 |
| VP Si 208 | 2.5 | 2.5 | 2.5 | 2.5 |
| ZnO | 3 | 3 | 3 | 3 |
| Stearic acid | 2 | 2 | 2 | 2 |
| Naftolen ZD | 10 | 10 | 10 | 10 |
| Vulkanox 4020 | 1.5 | 1.5 | 1.5 | 1.5 |
| Protektor G 3108 | 1 | 1 | 1 | 1 |
| 2nd stage Batch stage 1 | | | | |
| 3rd stage Batch stage 2 | | | | |
| Vulkacit D | 2 | 2 | 2 | 2 |
| Vulkacit CZ | 1.5 | 1.5 | 1.5 | 1.5 |
| Perkacit TBzTD | 0.2 | 0.2 | 0.2 | 0.2 |
| Sulfur | 1.5 | 1.5 | 1.5 | 1.5 |

The polymer VSL 5025-1 is an SBR copolymer from Bayer AG polymerized in solution and having a styrene content of 25 wt. % and a butadiene content of 75 wt. %. The copolymer comprises 37.5 phr oil and has a Mooney viscosity (ML 1+4/100° C.) of 50. The polymer Buna CB 24 is a cis-1,4-polybutadiene (neodymium type) from Bayer AG with a cis-1,4 content of at least 96% and a Mooney viscosity of 44±5. Ultrasil 7000 GR is a readily dispersible silica from Degussa AG and has a BET surface area of 170 m$^2$/g. Naftolen ZD from Chemetall is used as the aromatic oil, Vulkanox 4020 is PPD from Bayer AG, and Protektor G3108 is an anti-ozonant wax from Paramelt B.V. Vulkacit D (DPG) and Vulkacit CZ (CBS) are commercial products from Bayer AG. Perkacit TBzTD (tetrabenzylthiuram tetrasulfide) is a product from Flexsys N.V. The rubber mixtures are prepared in an internal mixer in accordance with the mixing instructions in Table 2.

TABLE 2

Stage 1

Settings

| | |
|---|---|
| Mixing unit | Werner & Pfleiderer E-type |
| Speed | 60 min$^{-1}$ |
| Plunger pressure | 5.5 bar |
| Empty volume | 1.58 L |
| Filling level | 0.56 |
| Flow temp. | 70° C. |

TABLE 2-continued

Mixing operation

| | |
|---|---|
| 0 to 1 min | Buna VSL 5025-1 + Buna CB 24 |
| 1 to 2 min | ½ silica, ZnO, stearic acid, Naftolen ZD, silane |
| 2 to 4 min | ½ silica, Vulkanox, Protektor |
| 4 min | clean |
| 4 to 5 min | mix |
| 5 min | air |
| 5 to 6 min | mix and deliver |
| Batch temp. | 145-155° C. |
| Storage | 24 h at room temperature |

Stage 2

Settings

| | |
|---|---|
| Mixing unit | As in stage 1 except: |
| Speed | 70 min$^{-1}$ |
| Flow temp. | 80° C. |
| Filling level | 0.54 |

Mixing operation

| | |
|---|---|
| 0 to 2 min | break up batch stage 1 |
| 2 to 5 min | maintain batch temperature 150° C. by varying speed |
| 5 min | Deliver |
| Batch temp. | 145-155° C. |
| Storage | 4 h at room temperature |

Stage 3

Settings

| | |
|---|---|
| Mixing unit | as in stage 1 except |
| Speed | 40 min$^{-1}$ |
| Filling level | 0.52 |
| Flow temp. | 50° C. |

Mixing operation

| | |
|---|---|
| 0 to 2 min | batch stage 2, accelerator, sulfur |
| 2 min | deliver and form skin on laboratory roll mill (diameter 200 mm, length 450 mm, flow temperature 50° C.) Homogenization: cut in 5* left, 5* right and turn over 6* for a wide roll nip (6 mm) and 3* for a narrow roll nip (3 mm) draw out a rolled sheet. |
| Batch temp. | <110° C. |

The methods for rubber testing are summarized in table 3.

TABLE 3

| Physical testing | Standard/Conditions |
|---|---|
| Tensile test on ring, 23° C. Tensile strength (MPa) Moduli (MPa) Elongation at break (%) | DIN 53504, ISO 37 |
| Graves tear propagation test | DIN 53 515 |
| DIN abrasion, 10 N load (mm$^3$) | DIN 53 516 |
| Ball rebound, 60° C. (%) | ASTM D 5308 |

Table 4 shows the results of the rubber testing.

TABLE 4

| Vulcanisate data | Unit | Mixture 1 (ref.) | Mixture 2 (ref.) | Mixture 3 (ref.) | Mixture 4 |
|---|---|---|---|---|---|
| Tensile strength | [MPa] | 12.8 | 15.2 | 12.2 | 15.2 |
| Modulus 100% | [MPa] | 1.2 | 1.2 | 1.3 | 1.2 |
| Modulus 300% | [MPa] | 5.8 | 6.2 | 6.1 | 6.7 |
| Modulus 300%/100% | [—] | 4.8 | 5.2 | 4.7 | 5.6 |

TABLE 4-continued

| Vulcanisate data | Unit | Mixture 1 (ref.) | Mixture 2 (ref.) | Mixture 3 (ref.) | Mixture 4 |
|---|---|---|---|---|---|
| Elongation at break | [%] | 480 | 480 | 460 | 460 |
| Tear propagation resistance | [N/mm] | 53 | 63 | 45 | 74 |
| Ball rebound (60° C.) | [%] | 65.5 | 69.5 | 65.1 | 69.1 |
| DIN abrasion | [mm$^3$] | 88 | 66 | 82 | 59 |

The fact that mercaptosilanes have a higher coupling yield and therefore amplication than a polysulfide is known from DE10015309A1. This is confirmed, by comparison of mixture 2 with mixture 1, by the higher amplification factor (modulus 300%/100%), the higher ball rebound value and the improved (lower) DIN abrasion.

In EP 1043357 A1, it is shown for triethoxysilylpropyl disulfide (Example 1) that by replacement of, in each case, two ethoxy groups per silicon atom by methyl groups (Example 2) no deterioration in the rubber properties, such as, for example, static data, such as tensile strength and moduli, and dynamic data, such as ball rebound, dynamic moduli and tan δ, compared with the triethoxy variant is to be recorded.

In contrast to the abovementioned observations for the polysulfides from EP 1043357, the dimethyl variant of the mercaptosilane (mixture 4 according to the invention) shows significant improvements in important properties. Thus, the modulus at 300% elongation, the amplification factor (modulus 300%/100%), the tear propagation resistance and the DIN abrasion are significantly better than in the case of the corresponding triethoxy variant (MPTES) (mixture 2). They are likewise significantly better than in the case of TESPT (mixture 1) and the corresponding dimethyl variant DMESPT (mixture 3).

Example 3

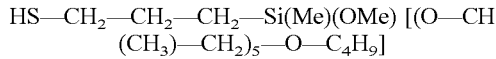

86.64 g HS—CH$_2$—CH$_2$—CH$_2$—Si(Me)(OMe)$_2$, 163.29 g polypropylene glycol monobutyl ether (CAS 9003-13-8, Aldrich, M$_w$=340 g/mol) and 0.23 g p-toluenesulfonic acid are mixed in a round-bottomed flask. The mixture is treated on a rotary evaporator at an oil bath temperature of 150-155° C. under 100-400 mbar for 6.5 h. The volatile alcohol liberated is distilled off. The weight of product isolated is 236 g.

Example 4

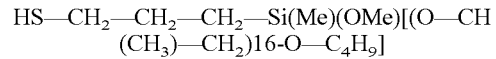

86.64 g HS—CH$_2$—CH$_2$—CH$_2$—Si(Me)(OMe)$_2$, 480.03 g polypropylene glycol monobutyl ether (CAS 9003-13-8, Aldrich, M$_w$=1,000 g/mol)) and 0.23 g p-toluenesulfonic acid are mixed in a round-bottomed flask. The mixture is treated on a rotary evaporator at an oil bath temperature of 145-155° C. under 100-400 mbar for 4.5 h. The volatile alcohol liberated is distilled off. The weight of product isolated is 552 g.

Example 5

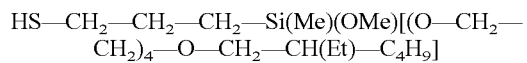

86.62 g HS—CH$_2$—CH$_2$—CH$_2$—Si(Me)(OMe)$_2$, 147 g polyethylene glycol mono-2-ethylhexyl ether (Aduxol HEX-04, CAS 26468-86-0, Schärer & Schläpfer AG) and 0.5 g Ti(OBu)$_4$ are mixed in a round-bottomed flask. The mixture is treated on a rotary evaporator at an oil bath temperature of 125-135° C. under 150-300 mbar for 4.5 h. The volatile alcohol liberated is distilled off. The weight of product isolated is 214 g.

Example 6

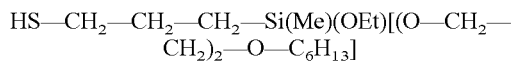

50 g HS—CH$_2$—CH$_2$—CH$_2$—Si(Me)(OEt)$_2$, 45.7 g diethylene glycol monohexyl ether (CAS 112-59-4, obtained via Merck/VWR International) and 0.23 g Ti(OBu)$_4$ are mixed in a round-bottomed flask. The mixture is treated on a rotary evaporator at an oil bath temperature of 130-135° C. under 100-300 mbar for 6 h. The volatile alcohol liberated is distilled off. The amount of the product isolated is 80 g.

Example 7

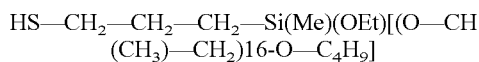

80 g HS—CH$_2$—CH$_2$—CH$_2$—Si(Me)(OEt)$_2$, 384.07 g polypropylene glycol monobutyl ether (CAS 9003-13-8, Aldrich, M$_w$=1,000 g/mol)) and 0.2 g p-toluenesulfonic acid are mixed in a round-bottomed flask. The mixture is treated on a rotary evaporator at an oil bath temperature of 145-155° C. under 100-300 mbar for 6 h. The volatile alcohol liberated is distilled off. The weight of the product obtained is 448 g.

Example 8

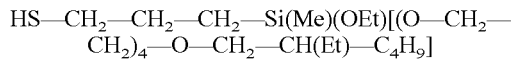

50 g HS—CH$_2$—CH$_2$—CH$_2$—Si(Me)(OEt)$_2$, 73.5 g polyethylene glycol mono-2-ethylhexyl ether (Aduxol HEX-04, CAS 26468-86-0, Schärer & Schläpfer AG) and 0.3 g Ti(OBu)$_4$ are mixed in a round-bottomed flask. The mixture is treated on a rotary evaporator at an oil bath temperature of 125-135° C. under 150-300 mbar for 4.5 h. The volatile alcohol liberated is distilled off. The weight of the product obtained is 108 g.

Example 9

Preparation of 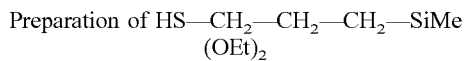

HS—CH$_2$—CH$_2$—CH$_2$—SiMe(OEt)$_2$ is prepared in accordance with the method of EP 1 538 152 A1 Example 4. The starting substances employed are Cl—CH$_2$—CH$_2$—CH$_2$—SiMe(OEt)$_2$, Cl—CH$_2$—CH$_2$—CH$_2$—SiMeCl$_2$, NaSH (dried) and ethanol. The suspension obtained is filtered and freed from the solvent and the silane is purified by distillation.

Example 10

Rubber Investigations

The recipe used for the rubber mixtures is given in the following Table 5. The mixtures differ in the coupling agent added, as stated in Table 6. The mixing instructions are given in Table 2.

TABLE 5

| Substance | Mixtures 5 to 13 [phr] |
|---|---|
| *1st stage* | |
| Buna VSL 5025-1 | 96 |
| Buna CB 24 | 30 |
| Ultrasil 7000 GR | 80 |
| Silanes from Table 6 | 2 |
| ZnO | 3 |
| Stearic acid | 2 |
| Naftolen ZD | 10 |
| Vulkanox 4020 | 1.5 |
| Protektor G 3108 | 1 |
| *2nd stage* | |
| *Batch stage 1* | |
| *3rd stage* | |
| *Batch stage 2* | |
| Vulkacit D | 2 |
| Vulkacit CZ | 1.5 |
| Perkacit TBzTD | 0.2 |
| Sulfur | 1.5 |

TABLE 6

| Mixture no. | Silane |
|---|---|
| 5 (ref.) | VP Si 263 |
| 6 | Silane from Example 1 |
| 7 | Silane from Example 9 |
| 8 | Silane from Example 3 |
| 9 | Silane from Example 4 |
| 10 | Silane from Example 5 |
| 11 | Silane from Example 6 |
| 12 | Silane from Example 7 |
| 13 | Silane from Example 8 |

The methods for the rubber testing are summarized in Table 7.

TABLE 7

| Physical testing | Standard/Conditions |
|---|---|
| Partial vulcanization properties, Partial vulcanization time $t_5$ Partial vulcanization time $t_{35}$ | DIN 53523/4, ISO 667, 130° C. |
| Tear propagation test DIE A | ASTM D 624 |
| Tear propagation test DIE B | ASTM D 624 |

Table 8 shows the results of the rubber testing.

TABLE 8

| Vulcanisate data | Unit | Mixture 5 (ref.) | Mixture 6 | Mixture 7 |
|---|---|---|---|---|
| Partial vulcanization time t5 | [min] | 14.0 | 10.2 | 13.0 |
| Partial vulcanization time t35 | [min] | 18.4 | 13.2 | 16.8 |
| Tear propagation resistance A | [N/mm] | 30.3 | 33.6 | 34.2 |
| Tear propagation resistance B | [N/mm] | 23.6 | 29 | 24.6 |

TABLE 8-continued

| Vulcanisate data | Unit | Mixture 8 | Mixture 9 | Mixture 10 |
|---|---|---|---|---|
| Partial vulcanization time t5 | [min] | 20.5 | 27.6 | 21.2 |
| Partial vulcanization time t35 | [min] | 24.1 | 31.7 | 24.9 |
| Tear propagation resistance A | [N/mm] | 39.9 | 47.5 | 40.0 |
| Tear propagation resistance B | [N/mm] | 33 | 42.6 | 34.8 |

| Vulcanisate data | Unit | Mixture 11 | Mixture 12 | Mixture 13 |
|---|---|---|---|---|
| Partial vulcanization time t5 | [min] | 19.9 | 26.1 | 19.2 |
| Partial vulcanization time t35 | [min] | 24.3 | 30.1 | 22.7 |
| Tear propagation resistance A | [N/mm] | 39.5 | 44.3 | 47.9 |
| Tear propagation resistance B | [N/mm] | 31.3 | 41.5 | 33.5 |

As can be seen from the vulkanisate results, the tear propagation resistances of mixtures 8 to 13 are significantly better than those of mixture 5, 6 and 7. The mixtures with the silanes with long-chain alcohol as substituents show improved tear propagation properties compared with the other mixtures. This applies both compared with unsubstituted mercaptosilane from mixture 5 (VP Si 263) and compared with the mercaptosilanes with one methyl group (mixture 7) and with two methyl groups (mixture 6). Mixtures 8 to 13 furthermore also show improved Mooney scorch data. An improved processing reliability, e.g., in the extrusion of tyre treads or injection moulding, is associated with this.

Example 11

Rubber Investigations

The recipe used for the rubber mixtures is given in the following Table 9. The mixtures differ in the coupling agent added on the basis of equimolar metering, as stated in Table 10. The mixing instructions are given in Table 2.

TABLE 9

| Substance | Mixtures 14 to 21 [phr] |
|---|---|
| *1st stage* | |
| Buna VSL 5025-1 | 96 |
| Buna CB 24 | 30 |
| Ultrasil 7000 GR | 80 |
| Silanes from Table 10 | equimolar |
| ZnO | 3 |
| Stearic acid | 2 |
| Naftolen ZD | 10 |
| Vulkanox 4020 | 1.5 |
| Protektor G 3108 | 1 |
| *2nd stage* | |
| *Batch stage 1* | |
| *3rd stage* | |
| *Batch stage 2* | |
| Vulkacit D | 2 |
| Vulkacit CZ | 1.5 |
| Perkacit TBzTD | 0.2 |
| Sulfur | 1.5 |

TABLE 10

| Mixture no. | Silane | phr |
|---|---|---|
| 14 | VP Si 263 | 2.00 |
| 15 | Silane from Example 9 | 1.75 |
| 16 | Silane from Example 3 | 4.31 |
| 17 | Silane from Example 4 | 9.68 |
| 18 | Silane from Example 5 | 3.82 |
| 19 | Silane from Example 6 | 2.97 |
| 20 | Silane from Example 7 | 9.80 |
| 21 | Silane from Example 8 | 3.94 |

The test carried out are listed in Table 7. Table 11 shows the results of the rubber testing.

TABLE 11

| Vulcanisate data | Unit | Mixture 14 | Mixture 15 | Mixture 16 | Mixture 17 |
|---|---|---|---|---|---|
| Partial vulcan-ization time t5 | [min] | 12.2 | 13.2 | 16.3 | 14.6 |
| Partial vulcan-ization time t35 | [min] | 16.1 | 17.2 | 20.9 | 19.7 |
| Tear propagation resistance A | [N/mm] | 28.3 | 30.1 | 32.9 | 37.6 |
| Tear propagation resistance B | [N/mm] | 24.0 | 25.2 | 29.9 | 31.4 |
| Vulcanisate data | Unit | Mixture 18 | Mixture 19 | Mixture 20 | Mixture 21 |
| Partial vulcanization time t5 | [min] | 20.1 | 15.2 | 17.0 | 14.6 |
| Partial vulcanization time t35 | [min] | 25.1 | 19.6 | 23.0 | 19.2 |
| Tear propagation resistance A | [N/mm] | 35.9 | 33.4 | 37.4 | 32.6 |
| Tear propagation resistance B | [N/mm] | 30.1 | 26.8 | 31.1 | 25.8 |

With equimolar metering also, the mixtures with the silanes from Examples 3 to 8 show advantages compared with unsubstituted mercaptosilane and mercaptosilane with one methyl and two ethoxy groups both in tear propagation properties and in scorch properties.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

What is claimed is:

1. A rubber mixture comprising rubber, fillers, and at least one organosilane of the general formula I:

$$R^1R^2R^3SiR^4\text{—SH} \qquad (I)$$

wherein:
$R^1$ is methyl or ethyl;
$R^2$ is —O—$(Y\text{—O})_m$—X where Y is a branched or unbranched, saturated or unsaturated divalent hydrocarbon group, X is a $C_1$-$C_9$-alkyl group and m=1-40, $R^3$ is methyl, ethyl, methoxy, ethoxy or a group according to $R^2$
and $R^4$ is a branched or unbranched, saturated or unsaturated, aliphatic, aromatic or mixed aliphatic/aromatic divalent $C_1$-$C_{12}$ hydrocarbon group.

2. The rubber mixture of claim 1, wherein $R^1$ is methyl.

3. The rubber mixture of claim 1, wherein $R^1$ is ethyl.

4. The rubber mixture of claim 1, wherein $R^3$ is methoxy.

5. The rubber mixture of claim 1, wherein $R^3$ is ethoxy.

6. The rubber mixture of claim 1, wherein $R^2$ is —O—$(Y\text{—O})_m$—X where Y is an unbranched, saturated divalent hydrocarbon group, X is a $C_1$-$C_9$-alkyl group and m=1-40.

7. The rubber mixture of claim 1, wherein $R^3$ is methyl.

8. The rubber mixture of claim 7, wherein $R^4$ a saturated or unsaturated $C_1$-$C_{12}$ alkyl.

9. The rubber mixture of claim 8, wherein $R^4$ is a saturated and unbranched $C_1$-$C_{12}$ alkyl.

10. The mixture of claim 7, wherein $R^4$ is an aromatic.

11. The rubber mixture of claim 1, wherein $R^3$ is ethyl.

12. The rubber mixture of claim 11, wherein $R^4$ is a saturated or unsaturated $C_1$-$C_{12}$ alkyl.

13. The rubber mixture of claim 12, wherein $R^4$ is a saturated and unbranched $C_1$-$C_{12}$ alkyl.

14. The mixture of claim 11, wherein $R^4$ is an aromatic.

15. The rubber mixture of claim 1, further comprising at least one rubber auxiliary.

16. The rubber mixture of claim 1, comprising polymerized organosilanes of the general formula I.

17. The rubber mixture of claim 15, wherein said rubber auxiliary is a polyalkylene glycol.

18. A process for the preparation of the rubber mixture of claim 1, comprising the step of mixing the rubber, filler, and the organosilane of the general formula I.

19. A shaped article comprising the rubber mixture of claim 1.

20. The shaped article of claim 19, wherein said shaped article is a pneumatic tires, tire tread, cable sheathing, hose, drive belt, conveyor belt, roller covering, tires shoe sole, sealing ring or damping element.

* * * * *